United States Patent
Spoerry et al.

(10) Patent No.: US 8,718,840 B2
(45) Date of Patent: May 6, 2014

(54) DEVICE, SYSTEM AND METHOD OF ESTIMATING THE ANGLE OF ATTACK OF AN AIRCRAFT

(75) Inventors: Thomas Spoerry, Ox (FR); Bruno Chauveau, Toulouse (FR)

(73) Assignees: Airbus Operations S.A.S., Toulouse (FR); Airbus, Blagnac (FR)

(*) Notice: Subject to any disclaimer, the term of this patent is extended or adjusted under 35 U.S.C. 154(b) by 538 days.

(21) Appl. No.: 12/599,898

(22) PCT Filed: May 7, 2008

(86) PCT No.: PCT/FR2008/000648
§ 371 (c)(1),
(2), (4) Date: Nov. 12, 2009

(87) PCT Pub. No.: WO2008/152242
PCT Pub. Date: Dec. 18, 2008

(65) Prior Publication Data
US 2011/0208375 A1 Aug. 25, 2011

(30) Foreign Application Priority Data
May 14, 2007 (FR) .................................. 07 55050

(51) Int. Cl.
*G06F 19/00* (2011.01)
*G06G 7/78* (2006.01)

(52) U.S. Cl.
USPC ................ 701/6; 701/7; 73/170.1; 73/170.07

(58) Field of Classification Search
USPC .................... 701/5, 3, 6, 8, 14, 4, 7; 702/181; 73/170.02, 170.01, 170.07, 178 R; 239/171; 244/136
See application file for complete search history.

(56) References Cited

U.S. PATENT DOCUMENTS

| | | | |
|---|---|---|---|
| 2,699,065 A | 1/1955 | Blair | |
| 3,190,114 A | 6/1965 | Westman | |
| 3,240,447 A * | 3/1966 | Olshausen | 244/177 |
| 4,110,605 A * | 8/1978 | Miller | 701/124 |
| 5,136,518 A * | 8/1992 | Glover | 701/5 |
| 5,369,993 A * | 12/1994 | Hagan | 73/178 R |
| 6,289,289 B1 * | 9/2001 | Zweifel | 702/34 |
| 6,305,218 B1 * | 10/2001 | Foster | 73/178 R |
| 6,761,057 B2 * | 7/2004 | Cronin et al. | 73/1.78 |
| 7,561,946 B1 * | 7/2009 | Schipper | 701/8 |
| 7,640,797 B2 * | 1/2010 | Smith et al. | 73/170.02 |
| 2003/0050766 A1 * | 3/2003 | Cronin et al. | 702/181 |
| 2007/0145191 A1 * | 6/2007 | Smith et al. | 244/136 |
| 2009/0099811 A1 | 4/2009 | Spoerry et al. | |

FOREIGN PATENT DOCUMENTS

WO 00 49419 8/2000

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

A device for estimating the angle of attack of an aircraft moving through the air comprises means for receiving a measured incidence presented locally by the air relative to the aircraft and means for determining the angle of attack of the aircraft as a function of the measured incidence and information about the airspeed of the aircraft. The means for determining the angle of attack of the aircraft comprise means for reading the angle of attack of the aircraft from a look-up table having at least the measured incidence and the airspeed information as inputs. Corresponding system and a corresponding method are also proposed.

10 Claims, 1 Drawing Sheet

DEVICE, SYSTEM AND METHOD OF ESTIMATING THE ANGLE OF ATTACK OF AN AIRCRAFT

The invention relates to a device, to a system and to a method for estimating the angle of attack of an aircraft.

The angle of attack of an aircraft moving in the air is traditionally estimated by means of dedicated transducers which locally measure the orientation of air filaments relative to the aircraft in a vertical plane, thus immediately providing access to the attack angle of the relative movement of the aircraft in the air at the point of the measurement.

Although determined locally, the attack angle information item delivered by the transducer is usually transmitted to the different systems of the aircraft (whether they are display or navigation systems using this information item) as an information item representative of the angle of attack of the entire aircraft in the air stream.

Nevertheless, a difference exists between the locally measured angle of attack and the general angle of attack of the aircraft, because of the particular situation of the transducer in question. For example, the angle of attack $\alpha_A$ of the airplane may be effectively defined as the angle between the axis X of the fuselage and the flight direction $\vec{V}_A$ in the air mass.

Furthermore, from document WO00/49419, for example, there are known solutions in which the values of angle of attack are stored in memory in correspondence to values based on the pressure, with the objective of obtaining a value of the angle of attack from pressure measurements. However, these considerations are not related to the problem alluded to hereinabove.

In order to solve the problem related to local measurement of the angle of attack and consequently to improve the estimate of the angle of attack of the aircraft, the invention proposes a device for estimating an angle of attack of an aircraft moving in the air, characterized by means for receiving a measured attack angle presented locally by the air relative to the aircraft and means for determining the angle of attack of the aircraft as a function of the measured attack angle and of an information item about the airspeed of the aircraft.

The means for determining the angle of attack of the aircraft comprise means for reading the angle of attack of the aircraft in a correspondence table having at least the measured attack angle and speed information item as entries.

In this way it is possible to correct the measurement error associated with the positioning of the transducer, which error has been noticed by the inventors to depend in particular on the airspeed of the aircraft.

For example, the speed information item represents a Mach number of the aircraft, particularly suitable for this purpose.

It is possible, for example, to provide means for determining a speed information item as a function of a static pressure information item and of a total pressure information item.

It is also possible to provide means for selecting the said correspondence table as a function of an information item indicative of the configuration of the lift devices of the aircraft, thus making it possible to adapt the correction to the aerodynamic configuration of the aircraft.

The invention therefore also proposes a system for estimating an angle of attack of an aircraft moving in the air, characterized by means for measuring an attack angle presented locally by the air relative to the aircraft and by means for determining the angle of attack of the aircraft as a function of the measured attack angle and of an information item about the airspeed of the aircraft as provided hereinabove.

In terms of method, the invention proposes a method for estimating an attack angle of attack of an aircraft moving in the air, characterized by the following steps:
  measuring an attack angle presented locally by the air relative to the aircraft;
  determining the angle of attack of the aircraft as a function of the measured attack angle and of an information item about the airspeed of the aircraft by reading the angle of attack of the aircraft in a correspondence table having at least the measured attack angle and the speed information item as entries.

This system and this method may incorporate optional characteristics corresponding to those envisioned hereinabove for the estimation device.

Other characteristics and advantages of the invention will become clearer upon reading the description hereinafter, written with reference to the attached drawings, wherein.

Figure 1:
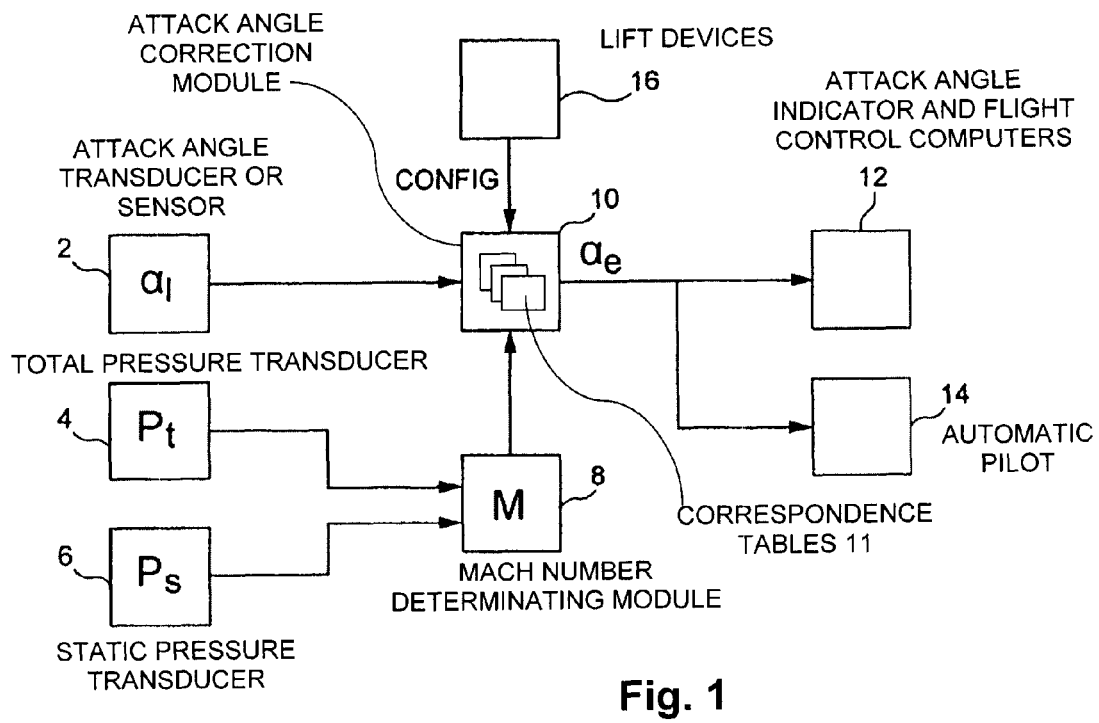
FIG. 1 represents a system for estimating an angle of attack, designed according to the teachings of the invention.

The system of FIG. 1 comprises an attack angle transducer or sensor 2, which delivers a measurement of a local angle of attack $\alpha_l$ representing the attack angle of the air stream at the location of the sensor (relative to a fixed reference associated with the aircraft).

Such an attack angle sensor is, for example, of the "weather vane" type, or in other words formed from a vane mounted on a pivot in such a way as to become positioned in the local air flow at right angles to the sensor, parallel to the air stream at this location.

Figure 2:
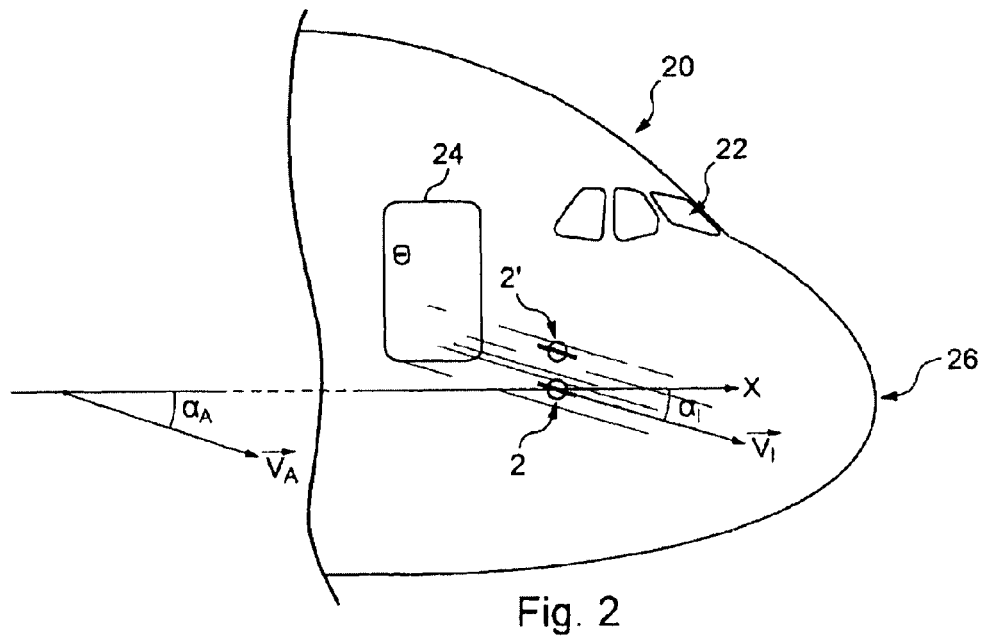
FIG. 2 represents the front part of an airplane incorporating attack angle sensors.

FIG. 2 illustrates an example of the positioning of an attack angle sensor 2 on the fuselage surface, in the forward part of an aircraft (in this case an airplane) 20, precisely in the region situated under cockpit 22 and forward of front door 24 (the term "forward" being understood in traditional manner, or in other words toward nose 26 of the airplane, in the direction X also illustrated in FIG. 2).

The measured angle of attack $\alpha_l$ is therefore the angle formed locally between the orientation of the velocity vector $\vec{V}_l$ of the air flow at right angles to the sensor and the direction X.

For the purpose of redundancy, other attack angle sensors may be provided on the surface of the airplane fuselage, such as, for example, an attack angle sensor 2' seen in FIG. 2, in this case situated on the same side of airplane 20 as attack angle sensor 2.

For example, airplane 20 shown in FIG. 2 also comprises two other attack angle sensors (not shown) on the other side that is not visible in FIG. 2.

The signals measured by each of the attack angle sensors may undergo the processing described hereinafter for attack angle sensor 2. Alternatively, the signals deriving from two or more attack angle sensors may be combined in order to deduce therefrom an average signal, which will undergo the processing described hereinafter.

The system presented in FIG. 1 also comprises a total pressure transducer 4 (of the "pitot" type, for example) which delivers a signal representative of the total pressure $P_t$, and a static pressure transducer 6 which delivers a signal representative of the static pressure $P_s$.

After being processed if necessary, the signals deriving from transducers 4, 6 are transmitted to a module 8 for determining the Mach number M of the airplane or any other variable comparable to a Mach number, calculated from signals representative of a total pressure $P_t$ and of a static pressure $P_s$.

The signals representative of the total pressure $P_t$ and of the static pressure $P_s$ are transmitted, for example, to module 8 in the form of digital data, in which case module 8 is designed, for example, by employing, in a processor, a program that determines the Mach number M of the airplane or any other variable comparable to a Mach number, according to the Saint-Venant formula (inverted):

$$M = \sqrt{5 \cdot \left[\left(\frac{Pt}{Ps}\right)^{\frac{(\gamma-1)}{\gamma}} - 1\right]}.$$

For example, $\gamma=1.4$ will be taken for the air.

The local attack angle information item $\alpha_l$ emitted by attack angle sensor 2 (or, alternatively, by a set of attack angle sensors as already mentioned) and the Mach number M determined by module 8 are transmitted to an attack angle correction module 10, which generates, on the basis of these information items, an information item $\alpha_e$ representative of the angle of attack estimated for the entire airplane 20 (hereinafter "airplane attack angle") according to methods that will now be described.

It is recalled here that this angle of attack is the angle formed, in a vertical plane, between the velocity vector of the airplane in the air and a reference associated with the airplane.

In a first embodiment, correction module 10 stores a plurality of correspondence tables 11 in memory.

Each correspondence table 11 contains a set of values of the estimated angle of attack $\alpha_e$, each associated with particular values of the local attack angle $\alpha_l$ and the Mach number M (which therefore constitute the entries of the correspondence table 11).

Furthermore, each correspondence table is associated with particular conditions of configuration of lift devices (of the slats and flaps type), thus making it possible to adapt the correction of the angle of attack as a function of the aerodynamic configuration of airplane 20 (this configuration having an effect on the difference that exists between the measured local attack angle $\alpha_l$ and the attack angle of the entire airplane, or in other words the value to be estimated).

In this way, correction module 10 selects a correspondence table 11 as a function of the configuration information item CONFIG representative of the position of lift devices 16 and reads, in the selected correspondence table, the estimated value of the airplane attack angle $\alpha_e$ associated with the values of local attack angle $\alpha_l$ and of the Mach number M that module 10 receives respectively from attack angle sensor 2 and from module 8 for determining the Mach number.

The estimated airplane attack angle $\alpha_e$ is then transmitted to the different airplane systems using this information item, namely, for example, an attack angle indicator for the crew, flight control computers 12, the automatic pilot 14, etc.

Correction module 10, in common with module 8 for determining the Mach number, can be designed in the form of a processor executing a program that makes it possible to employ the functionalities just described, especially reading of data in correspondence tables stored in a memory associated with this processor.

Such a system can be integrated into the "air" data computer, with which airplane 20 is equipped, is commonly known by the term ADC (for "Air Data Computer").

The correspondence tables mentioned hereinabove are, for example, filled in during flight tests with a dedicated apparatus provided with other sensors for measuring the attack angle (in order to obtain a precise representation of the attack angle of the airplane). This step corresponds to calibration of correspondence tables which can then be used as standard equipment for all apparatus of the same type.

The foregoing examples are merely possible modes of employment of the invention, which is not limited thereto.

The invention claimed is:

1. A device for estimating an estimated fuselage angle of attack of an aircraft moving in the air, the device comprising:
    a sensor that measures an attack angle based on a direction of the air flowing relative to at least one point on a surface of the aircraft;
    a memory that stores correspondence tables, each correspondence table is associated with a different configuration of positions of lift devices of the aircraft, and each correspondence table includes entries that relate the measured attack angle and a speed information item about an airspeed of the aircraft to a corresponding estimated fuselage angle of attack of the fuselage of the aircraft; and
    a determining section that selects a correspondence table stored in the memory that is associated with the current position of the lift devices of the aircraft, and selects an entry in the selected correspondence table based on the measured attack angle and the speed information item about the airspeed of the aircraft as the estimated fuselage attack angle of the aircraft.

2. The device according to claim 1, comprising a selecting section that selects the correspondence table as a function of a lift device information item indicative of the configuration of the lift devices of the aircraft.

3. The device according to claim 1, wherein the speed information item is a Mach number of the aircraft.

4. The device according to claim 1, comprising a speed determining section that determines the speed information item as a function of a static pressure information item and of a total pressure information item.

5. A system for estimating an estimated fuselage angle of attack of an aircraft moving in the air, the system comprising:
    a sensor configured to measure a measured attack angle based on a direction of the air flowing relative to at least one point on a surface of the aircraft;
    a module that receives the measured fuselage attack angle from the sensor;
    a memory that stores correspondence tables, each correspondence table is associated with a different configuration of positions of lift devices of the aircraft, and each correspondence table includes entries that relate the measured attack angle and a speed information item about an airspeed of the aircraft to a corresponding estimated fuselage angle of attack of the fuselage of the aircraft; and
    a determining section that selects a correspondence table stored in the memory that is associated with the current position of the lift devices of the aircraft, and selects an entry in the selected correspondence table based on the measured attack angle and the speed information item about the airspeed of the aircraft as the estimated fuselage attack angle of the aircraft.

6. The system according to claim 5, wherein the sensor includes a vane mounted on a pivot in such a way as to become positioned parallel to the air stream.

7. A method for estimating an estimated fuselage angle of attack of an aircraft moving in the air, the method comprising:

measuring, using a sensor, a measured fuselage attack angle based on a direction of the air flowing relative to at least one point on a surface of the aircraft;

storing plural correspondence tables each associated with a different configuration representative of positions of lift devices of the aircraft, each correspondence table including entries that relate the measured fuselage attack angle and a speed information item about an airspeed of the aircraft to the estimated fuselage angle of attack of the fuselage of the aircraft; and selecting a stored correspondence table that is associated with the current position of the lift devices of the aircraft, and select an entry in the selected correspondence table based on the measured attack angle and the speed information item about the airspeed of the aircraft as the estimated fuselage attack angle of the aircraft.

8. The method according to claim 7, further comprising selecting the correspondence table as a function of a lift device information item indicative of the configuration of the lift devices of the aircraft.

9. The method according to claim 7, wherein the speed information item is a Mach number of the aircraft.

10. The method according to claim 7, wherein the measuring includes positioning, parallel to the air stream, a pivot-mounted vane.

* * * * *